US008271302B2

(12) United States Patent
Becerra (10) Patent No.: US 8,271,302 B2
(45) Date of Patent: Sep. 18, 2012

(54) FINANCIAL SYSTEMS AND METHODS FOR PROVIDING LOANS TO INDIVIDUALS IN RESPONSE TO THE OCCURRENCE OF A QUALIFYING EVENT

(75) Inventor: Manuel Becerra, Miami, FL (US)

(73) Assignee: Assurant, Inc., New York, NY (US)

( * ) Notice: Subject to any disclaimer, the term of this patent is extended or adjusted under 35 U.S.C. 154(b) by 369 days.

(21) Appl. No.: 12/539,297

(22) Filed: Aug. 11, 2009

(65) Prior Publication Data

US 2010/0100400 A1   Apr. 22, 2010

Related U.S. Application Data

(60) Provisional application No. 61/088,172, filed on Aug. 12, 2008.

(51) Int. Cl.
*G06Q 40/00* (2012.01)
(52) U.S. Cl. .................... 705/4; 705/35; 705/38
(58) Field of Classification Search ............... 705/4, 35, 705/38
See application file for complete search history.

(56) References Cited

U.S. PATENT DOCUMENTS

| | | | |
|---|---|---|---|
| 4,839,804 A | 6/1989 | Roberts et al. | |
| 5,926,800 A | 7/1999 | Baronowski et al. | |
| 6,315,196 B1 | 11/2001 | Bachman | |
| 6,470,321 B1 | 10/2002 | Cumming et al. | |
| 7,302,413 B1 * | 11/2007 | Bent et al. | 705/38 |
| 7,421,406 B2 * | 9/2008 | Dixon et al. | 705/36 R |
| 7,778,904 B1 * | 8/2010 | Lyons | 705/35 |
| 7,941,355 B1 * | 5/2011 | DeLoach | 705/35 |
| 2001/0047325 A1 | 11/2001 | Livingston | |
| 2002/0007342 A1 * | 1/2002 | Sellers et al. | 705/38 |
| 2002/0035489 A1 * | 3/2002 | Herman et al. | 705/4 |
| 2002/0194094 A1 * | 12/2002 | Lancaster et al. | 705/35 |
| 2002/0198801 A1 * | 12/2002 | Dixon et al. | 705/35 |

(Continued)

FOREIGN PATENT DOCUMENTS

WO   WO-2005/124643 A2   12/2005

OTHER PUBLICATIONS

Beyond credit life: Involuntary unemployment insurance; American Bankers Association. ABA Banking Journal; Jun. 1993; 85, 6; 1-page.*

(Continued)

*Primary Examiner* — Gregory Johnson
(74) *Attorney, Agent, or Firm* — Alston & Bird LLP (57) ABSTRACT

Computer systems that, in various embodiments, are configured for: (A) storing policy information within the system's memory, the policy information indicating that a particular individual holds a policy that provides the individual with the option to, upon the occurrence of a qualifying event, receive a loan at a below-market rate (e.g., 0%); (B) receiving data indicating that the qualifying event has occurred; and (C) at least partially in response to receiving the data indicating that the qualifying event has occurred, facilitating the provision of the loan to the particular individual at the below-market rate. The qualifying event may be, for example: (A) the death of a specified individual (e.g., the policy holder); (B) the disability of the specified individual; (C) the involuntary unemployment of the specified individual; (D) the birth of the specified individual's child; or (E) the adoption of a child by the specified individual.

41 Claims, 7 Drawing Sheets

U.S. PATENT DOCUMENTS

| | | | | |
|---|---|---|---|---|
| 2003/0009358 | A1* | 1/2003 | Greenfeld et al. | 705/4 |
| 2004/0088203 | A1* | 5/2004 | Kakuwa et al. | 705/4 |
| 2004/0243508 | A1* | 12/2004 | Samson et al. | 705/38 |
| 2004/0254878 | A1* | 12/2004 | Fitzsimmons et al. | 705/38 |
| 2005/0060206 | A1* | 3/2005 | Mitchell | 705/4 |
| 2005/0086085 | A1 | 4/2005 | Berlin et al. | |
| 2005/0108064 | A1* | 5/2005 | Castleman et al. | 705/4 |
| 2005/0125259 | A1* | 6/2005 | Annappindi | 705/4 |
| 2005/0177491 | A1* | 8/2005 | Siverson et al. | 705/38 |
| 2005/0278246 | A1* | 12/2005 | Friedman et al. | 705/38 |
| 2005/0289044 | A1* | 12/2005 | Breslin et al. | 705/38 |
| 2006/0085334 | A1* | 4/2006 | Murphy | 705/40 |
| 2006/0111949 | A1 | 5/2006 | Krasnerman | |
| 2006/0116903 | A1* | 6/2006 | Becerra | 705/2 |
| 2007/0055617 | A1 | 3/2007 | Garcia et al. | |
| 2007/0055620 | A1* | 3/2007 | Garcia et al. | 705/38 |
| 2007/0106598 | A1* | 5/2007 | Schollaert et al. | 705/38 |
| 2007/0106603 | A1* | 5/2007 | Whyte et al. | 705/39 |
| 2007/0156552 | A1* | 7/2007 | Manganiello | 705/35 |
| 2007/0156581 | A1* | 7/2007 | Imrey et al. | 705/39 |
| 2007/0250439 | A1* | 10/2007 | Crocker | 705/38 |
| 2007/0271178 | A1* | 11/2007 | Davis et al. | 705/38 |
| 2007/0282737 | A1* | 12/2007 | Brasch | 705/38 |
| 2008/0091594 | A1* | 4/2008 | Abramson et al. | 705/39 |
| 2008/0162336 | A1* | 7/2008 | Jaffee | 705/38 |
| 2008/0262921 | A1* | 10/2008 | Telljohann et al. | 705/14 |
| 2009/0024478 | A1* | 1/2009 | Dixon et al. | 705/14 |
| 2009/0048957 | A1* | 2/2009 | Celano | 705/35 |
| 2009/0048972 | A1* | 2/2009 | Bierer et al. | 705/44 |
| 2009/0063330 | A1* | 3/2009 | Cerise et al. | 705/38 |
| 2009/0150190 | A1* | 6/2009 | Solomon et al. | 705/4 |
| 2010/0023390 | A1* | 1/2010 | Kim | 705/14.27 |
| 2010/0145734 | A1* | 6/2010 | Becerra et al. | 705/4 |
| 2010/0228651 | A1* | 9/2010 | Becerra et al. | 705/34 |
| 2010/0306108 | A1* | 12/2010 | Bierer et al. | 705/44 |
| 2011/0087594 | A1* | 4/2011 | Bierer et al. | 705/44 |

OTHER PUBLICATIONS

Financial product reference; Money Marketing; Nov. 4, 2004; 4-pages.*

Give yourself a break, protect your income If you plan to buy insurance to protect your income in the event of illness, choose carefully: some policies are better than others, says Emma Simon; Emma Simon; Sunday Telegraph (United Kingdom); Jul. 1, 2007; 3-pages.*

Income insurance that isn't a rip-off can work for you; Harvey Jones; Express on Sunday; Dec. 10, 2006; 3-pages.*

Lenders 'mis-selling' unemployment cover; Kathryn Cooper; Sunday Times (United Kingdom); Jul. 29, 2001; 3-pages.*

New Plans, New Policies; Ferling, Rhona L.; Novak, Catherine A.; Best's Review (Life/Health), v91n12; Apr. 1991; 16-pages.*

Sometimes protection is such a racket; Sunday Independent (Ireland); Feb. 3, 2008; 3-pages.*

The protection racket; Daily Mail; Jun. 27, 2007; 3-pages.*

We're running for cover as the economic clouds gather. But will we be safe or sorry?; Esther Shaw; Independent on Sunday; May 18, 2008; 3-pages.*

"Types of Life Insurance Policies" [online], 2004-2007 [retrieved Aug. 19, 2010]. Retrieved from the Internet: <http://web.archive.org/web/20080611145137/http://www.360financialliteracy.org/Life+Stages/Parenthood/Articles/Life+Insurance/Types+of+life+insurance+policies.htm>. 3 pages.

"LIC Money Back for 20 Years" [online], Dec. 11, 2009 [retrieved Aug. 26, 2010]. Retrieved from the Internet: <http://www.avdhootinvestment.com/moneyback.html>. 2 pages.

* cited by examiner

FINANCIAL SYSTEMS AND METHODS FOR PROVIDING LOANS TO INDIVIDUALS IN RESPONSE TO THE OCCURRENCE OF A QUALIFYING EVENT

CROSS-REFERENCE TO RELATED APPLICATIONS

This application claims priority to U.S. Provisional Application 61/088,172, filed Aug. 12, 2008, which is hereby incorporated herein in its entirety by reference.

BACKGROUND OF VARIOUS EMBODIMENTS

Credit insurance programs have been sold to consumers for over 100 years. Consumers pay a premium in exchange for insurance coverage that promises to pay all or a portion of a loan balance or minimum monthly payments in the event that the purchaser experiences a hardship brought on by any one of a number of named life events such as death, disability or unemployment.

Debt suspension and debt cancellation programs (debt protection programs) were more recently introduced by lending institutions that wanted to provide consumers with benefits substantially similar to those available under a credit insurance policy, but through a modification to their lending agreement. These programs became more widely available to consumers through credit card issuing banks in the late 90's but were originally disclosed by the OCC as an option in 1964. Today, debt protection programs are offered by most major credit card issuers.

Additionally, both of these types of products are offered to customers in connection with the extension of credit associated with a specific loan transaction. The products are offered by each individual loan originator. As a result, consumers who wish to secure coverage for all of their loan obligations must respond to offers from each loan originator or servicer. In some cases, the products may not be available or the coverages and terms may vary by lending institution.

Some insurance companies and lenders have attempted to create insurance and debt protection programs that pay benefits beyond a minimum monthly benefit or the outstanding loan balance associated with a particular loan. For example, one program promises to pay customers a fixed benefit based on their coverage selection, to cover other loan obligations. Another program, distributed through employer groups, promises to provide the consumer with fixed benefits that would replace all or a portion of the customer's income so that the customer can pay for food, utilities and loan payments.

Under currently available models, the cash provided to the customer represents the benefit of the program. The insurance companies or the lenders have no expectations of repayment. Consumer studies suggest that these benefits are greater than what customers need to satisfy the financial hardships brought on by the events these programs are intending to cover. As a result, the premiums that a customer must pay to secure this type of coverage are often prohibitively high.

As an alternative to the programs discussed above, consumers might seek assistance from banks in the form of a loan during periods of financial hardship. However, it is well understood that banks will not typically provide unsecured loans to consumers during periods of financial hardship due to loan underwriting restrictions and/or sound business practices. Those who might lend monies under these circumstances typically do so at extraordinarily high rates that serve to create additional hardship for the consumer.

Systems according to various embodiments of the present invention are configured to facilitate the implementation of a plan that provides consumers with the cash they need during periods of financial hardship, but with lower associated premium payments.

BRIEF SUMMARY OF VARIOUS EMBODIMENTS

A computer system according to various embodiments of the invention comprises one or more processors and memory. In particular embodiments, the computer system is configured for: (A) storing, within the system's memory, policy information indicating that a particular individual holds a policy that provides the particular individual with the option to, upon the occurrence of a qualifying event, receive a loan at a below-market rate (e.g., 0%); (B) receiving data indicating that the qualifying event has occurred; and (C) at least partially in response to receiving the data indicating that the qualifying event has occurred, facilitating the provision of the loan to the particular individual at the below-market rate. In various embodiments, the qualifying event is one or more of the following: (A) the death of a specified individual (e.g., the policy holder); (B) the disability of the specified individual; (C) the involuntary unemployment of the specified individual; (D) the birth of the specified individual's child; or (E) the adoption of a child by the specified individual.

In particular embodiments, the policy is an insurance policy under which: (1) in response to an occurrence of the qualifying event, the individual is to receive the loan in the form of one or more payments to be made to the individual from an insurance company; and (2) the individual is to ultimately repay at least a portion of the one or payments to the insurance company.

In other embodiments, the policy provides that: (1) in response to an occurrence of the qualifying event, the individual is to receive the loan in the form of one or more payments made to the individual from a lender (e.g., a bank); and (2) the individual is to ultimately repay at least a portion of the one or more payments to the lender. In various embodiments, the lender holds insurance that specifically protects the lender from losses that the bank may incur as a result of making the loan to the individual under the policy. This insurance may, for example, provide for the payment, to the lender, of interest credits that serve to buy down the interest rate charged to the individual for the loan.

In various embodiments: (1) in response to an occurrence of the qualifying event, the individual is to receive the loan in the form of one or more payments made to the individual from a lender; (2) the individual is to ultimately repay at least a portion of the one or payments to the lender; and (3) under the terms of the policy, an insurance company guarantees the loan and/or agrees to pay at least a portion of the interest accrued on the loan during a period in which the loan is outstanding.

In certain embodiments, the computer system is configured to receive, from the individual, at least one policy preference such as: (A) an amount of funds to be loaned to the individual under the policy; (B) whether, under the terms of the policy, the individual will ultimately pay back (1) all funds distributed to the individual under the policy, or (2) a predetermined portion of the funds distributed to the individual under the policy; (C) an interest rate that the individual wishes to pay on any portions of the funds to be paid back under the policy; or (D) a schedule according to which the individual will pay back the funds. In such embodiments, the computer system may be further configured to facilitate the implementation of the policy according to the at least one policy preference, and calculate a premium amount to be charged to the individual for the policy. This premium amount may be based, at least in part, on the at least one policy preference.

In particular embodiments, the computer system is adapted to allow the individual (which, as noted above, may be the policy holder) to schedule a payment of at least a portion of the loan directly from an institution providing the loan to an entity other than the individual. In addition, the computer system may be adapted to receive information from the individual regarding a plurality of the individual's financial obligations and, based at least in part on this information, determine an optimized schedule for using at least a portion of the loan to repay the financial obligations. The system may be further configured to allow the user to schedule repayment, via the computer system, of the financial obligations according to the optimized schedule.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF VARIOUS EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein. Rather, these embodiments are provided so that this disclosure will satisfy applicable legal requirements. Like numbers refer to like elements throughout.

Brief Overview

Disclosed are various systems and methods for implementing a funding assurance plan that provides consumers with cash they need to meet short-term obligations (e.g., credit card payments, auto payments, and mortgage payments) and immediate basic needs (e.g., food, shelter, clothing) in which the consumer is assisted through payments that are made in response to the occurrence of a covered event. In particular embodiments, the customer is expected to either fully or partially pay back any funds distributed under the plan. In various embodiments, the plan is set up to allow the customer to return the funds through a series of payments that are distributed over a pre-determined (e.g., extended) period of time.

In particular embodiments, the customer pays interest on any funds received through the plan. This interest may be at market rates, or at submarket interest rates (e.g., less than 2% interest). In other embodiments, the customer pays no interest on any funds received through the plan.

In various embodiments, the consumer pays premium for an insurance policy, or other financial product, which promises to provide the customer with access to a fixed or fluctuating cash benefit stream in the event that the customer experiences a life event specified in the policy. In particular embodiments, the benefit payments are accumulated. Upon the conclusion of the covered event, or sometime thereafter, the customer is expected to begin repaying all or a portion of the total funds received under the plan in the form of payments that may be distributed over a specified or fluctuating repayment period. In certain embodiments, during the payout and/or repayment periods, the customer pays little or no interest on the amounts distributed.

In particular embodiments, a computer system may be used to facilitate the implementation of the plan. This computer system may, for example, be adapted to calculate the appropriate premiums for the plan based, at least in part, on such factors as: (1) the customer's specific election of the amount of funds expected to be needed; (2) whether the customer wishes to ultimately pay back (a) all funds distributed to the customer under the plan, or (b) a predetermined portion of the funds distributed to the customer under the plan; and (3) the customer's elected interest rate (for example, the customer may choose whether to pay 0%, 1%, or 2% interest on the distributed funds). In various embodiments, the computer system tracks the accumulation of payouts and the amounts to be paid back from the customer from the time of the first payout to the full collection of the amounts to be returned.

System Architecture

Figure 1:
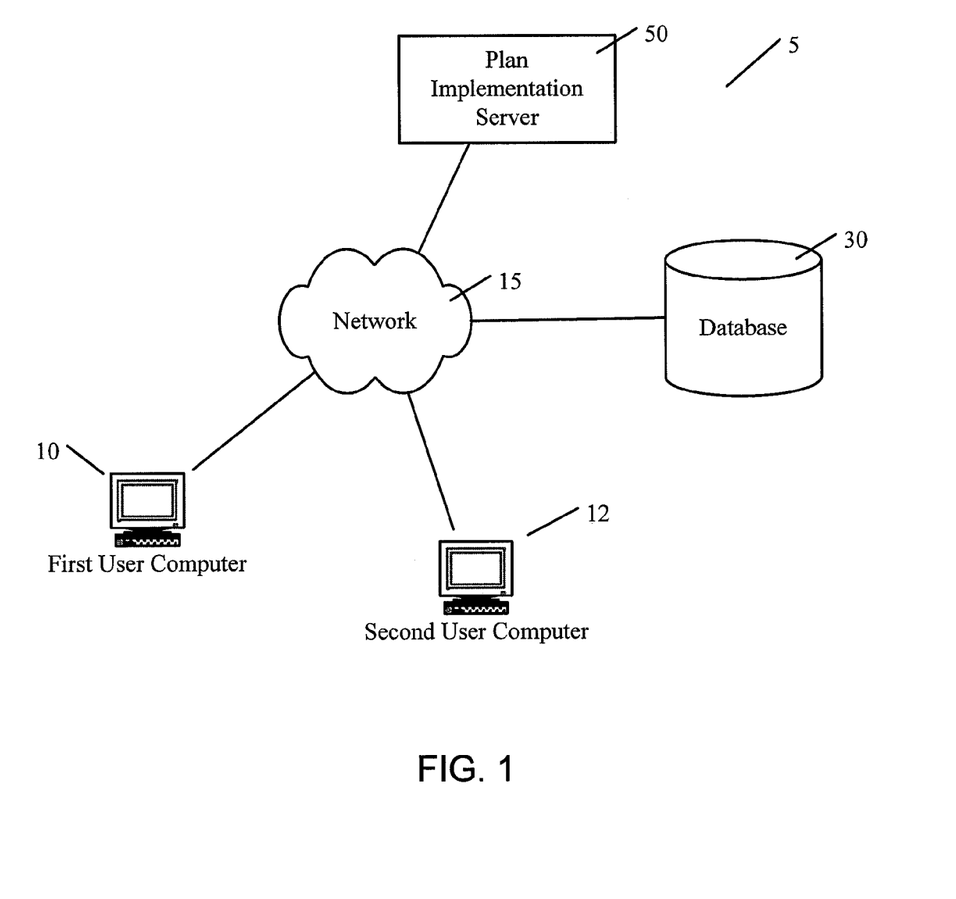
FIG. 1 is a block diagram of a Plan Implementation System according to a particular embodiment.

In various embodiments, a Plan Implementation Computer System 5 is used to implement the funding assurance plan. One embodiment of a suitable Plan Implementation Computer System 5 is shown in FIG. 1. As may be understood from this figure, in this embodiment, the system 5 includes one or more user computers 10, 12 that are connected, via a network 15 (e.g., a LAN or the Internet), to communicate with a Plan Implementation Server 50. In a particular embodiment, the first user computer 10 is a computer associated with a customer and the second user computer 12 is a computer associated with a bank or insurance company. In one embodiment of the invention, the plan implementation system 5 is configured for retrieving data from and storing data to a database 30 that may be stored on (or, alternatively, stored remotely from) the Plan Implementation Server 50.

Figure 2:
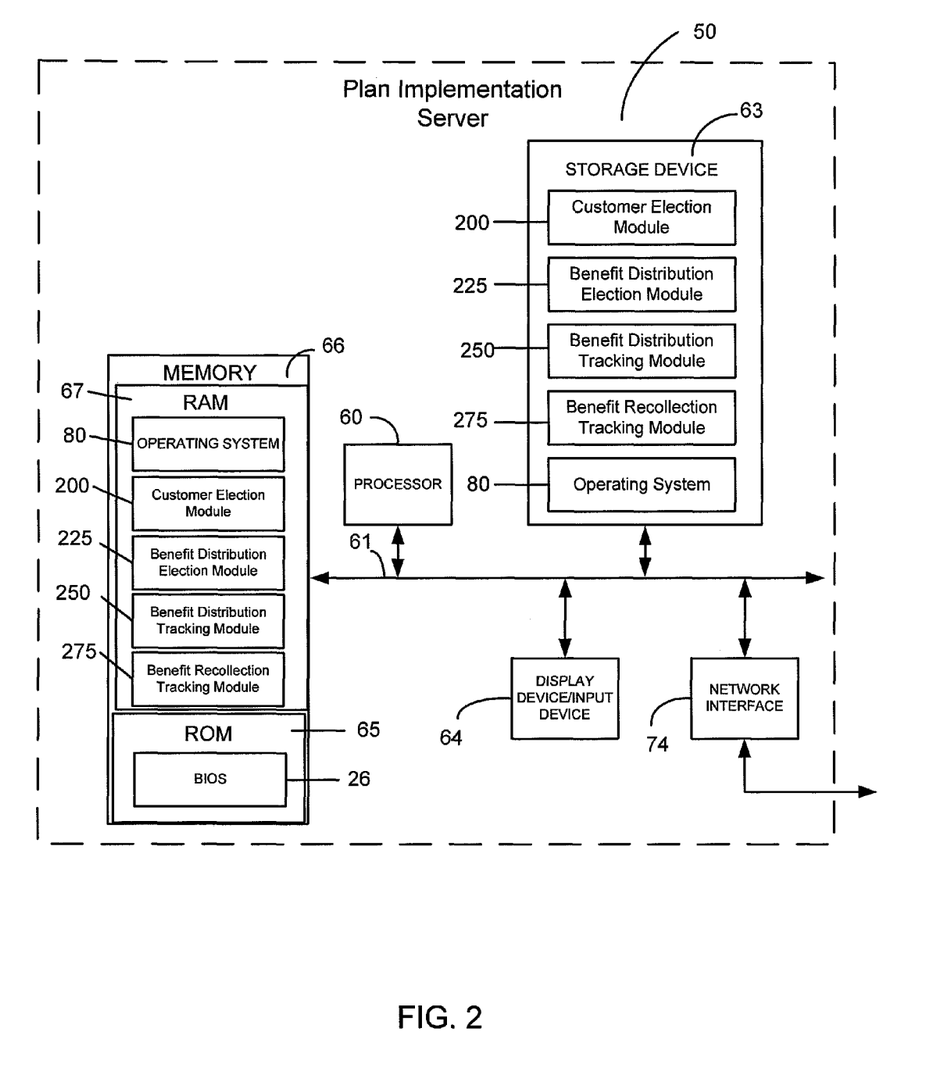
FIG. 2 is a schematic diagram of a Plan Implementation Server according to one embodiment.

FIG. 2 shows a schematic diagram of a Plan Implementation Server 50 according to one embodiment of the invention. The Plan Implementation Server 50 includes a processor 60 that communicates with other elements within the Plan Implementation Server 50 via a system interface or bus 61. Also included in the Plan Implementation Server 50 is a display device/input device 64 for receiving and displaying data. This display device/input device 64 may be, for example, a keyboard or pointing device that is used in combination with a monitor. The Plan Implementation Server 50 further includes memory 66, which preferably includes both read only memory (ROM) 65 and random access memory (RAM) 67. The server's ROM 65 is used to store a basic input/output system 26 (BIOS), containing the basic routines that help to transfer information between elements within the Plan Implementation Server 50.

In addition, the Plan Implementation Server 50 includes at least one storage device 63, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 63 is connected to the system bus 61 by an appropriate interface. The storage devices 63 and their associated computer-readable media provide nonvolatile storage for a personal computer. It is important to note that the computer-readable media described above could be replaced by any other type of computer-readable media known in the art. Such media include, for example, magnetic cassettes, flash memory cards, digital video disks, and Bernoulli cartridges.

A number of program modules may be stored by the various storage devices and within RAM 67. Such program modules include an operating system 80, a Customer Election Module 200, a Benefit Distribution Election Module 225, a Benefit Distribution Tracking Module 250, and a Benefit Recollection Tracking Module 275. The Customer Election Module 200, the Benefit Distribution Election Module 225, the Benefit Distribution Tracking Module 250, and the Benefit Recollection Tracking Module 275 control certain aspects of the operation of the Plan Implementation Server 50, as is described in more detail below, with the assistance of the processor 60 and an operating system 80.

Also located within the Plan Implementation Server 50 is a network interface 74, for interfacing and communicating with other elements of a computer network. It will be appreciated by one of ordinary skill in the art that one or more of the Plan Implementation Server 50 components may be located geographically remotely from other Plan Implementation Server 50 components. Furthermore, one or more of the components may be combined, and additional components performing functions described herein may be included in the Plan Implementation Server 50.

Figure 3:
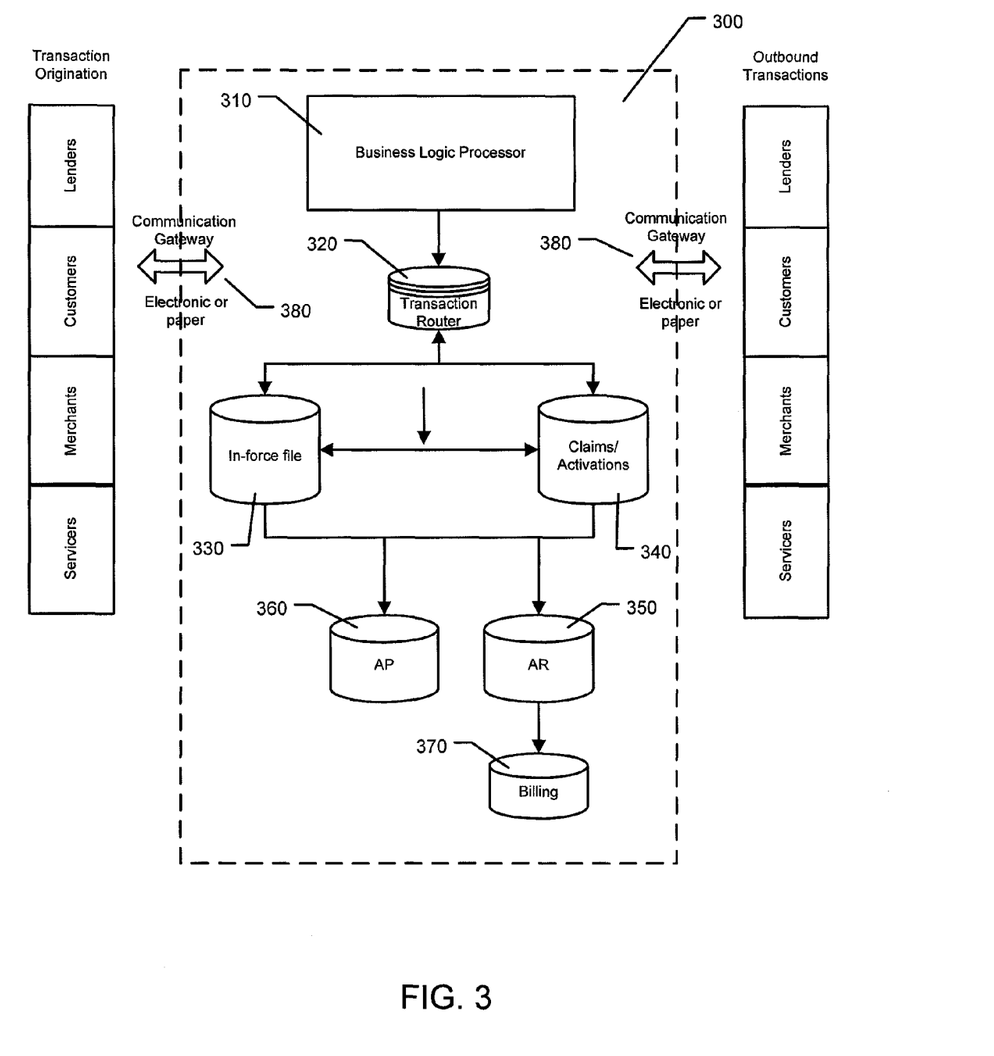
FIG. 3 is a block diagram of a Plan Implementation System according to a further embodiment.

Another embodiment of a plan implementation system is shown in FIG. 3. In this embodiment, the Plan Implementation System 300 includes a Business Logic Processor 310 that is adapted for receiving and processing transaction information, and for passing the information to a Transaction Router 320, which routs information regarding the transaction to various other components of the system 300 for processing. The system 300 further includes an In-Force File 330, which may be, for example, a database or file that stores a listing of plans/policies that are currently in force. The system 300 further includes a Claims/Activations Server 340 that is configured for processing activations of new plans/policies, and for processing claims filed under those policies.

In this embodiment, the system 300 also includes an Accounts Receivable Server 350 and a Billing Server 370, which are adapted, respectively, to handle accounts receivable information and to process bills. In addition, the system 300 includes an Accounts Payable Server 360 for handling accounts payable.

In particular embodiments, the system 300 also includes a communication gateway 380 that is adapted for facilitating communications between the system 300 and, for example, servicers, merchants, customers, and lenders. The communication gateway 380 may, for example, be adapted for handling the following types of inbound transactions and information: (1) new enrollments; (2) information regarding new insureds; (3) customer loan information; (4) customer instructions on cash disbursements; (5) billing transactions; and (6) debt history information. The communication gateway 380 may, for example, be adapted for handling the following types of outbound transactions and information: (1) fulfillment package information; (2) requests for benefit communications; (3) payments; (4) billing; and (5) customer service communications.

More Detailed Discussion of Various Embodiments

Various embodiments of the invention are described in greater detail below. These embodiments include: (1) a pure insurance policy embodiment; (2) a bank loan embodiment; (3) another insurance policy embodiment in which the funds are paid by a specified lender other than the insurance company offering the policy; and (4) a bank loan with default coverage embodiment.

Pure Insurance Policy Embodiment

In particular embodiments, the customer pays premium (e.g., monthly premiums) for an insurance policy in which the insurance company agrees to provide payments directly to the customer in the event that the customer experiences a covered event such as, for example: (1) the unemployment of a specified individual; (2) the birth of a specified individual's child; (3) the adoption of a child by a specified individual; (4) the disability of a specified individual; or (5) the death of a specified individual, as specified in the policy. (In particular embodiments, the specified individual is the policy holder.)

Figure 4:
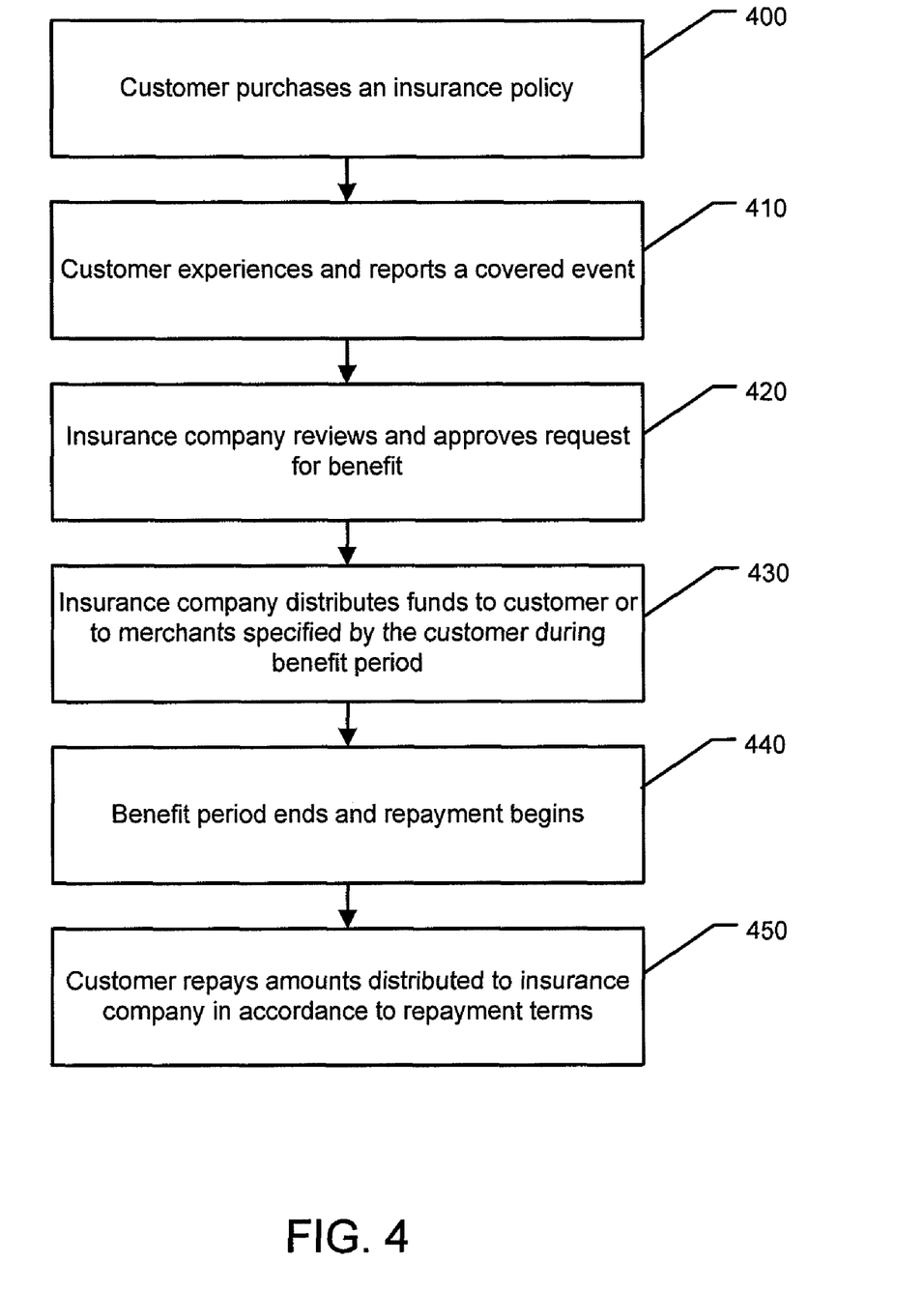
FIG. 4 is a flow chart illustrating the relationship between a customer and an insurance company in an embodiment in which the insurance company provides benefit payments directly to the customer, accumulates those payments, and then collects amounts previously paid out over a specified period.

Various exemplary steps associated with this embodiment are shown in FIG. 4. As shown in this figure, beginning at Step 400, the customer purchases an insurance policy. Later, at Step 410, the customer experiences, and reports, a covered event to the insurance company (e.g., by electronically transmitting a request for benefit via the Plan Implementation System 300). Next, at Step 420, the insurance company reviews the customer's request for benefits under the plan and, if appropriate, approves the request for benefit. At Step 430, the insurance company then distributes funds to the customer (and/or to other entities specified by the customer) during the benefit period. After the benefit period ends (e.g., at Step 440), the repayment period begins. During this repayment period, at Step 450, if called for under the plan, the customer repays amounts distributed to the insurance company in accordance with the plan's repayment terms.

Bank Loan Embodiment

In certain embodiments, the customer pays fees to a bank to secure a loan in which the distribution of loan proceeds is limited and/or conditioned upon the occurrence and/or continuation of a specified covered event such as, for example: (1) the unemployment of a specified individual; (2) the birth of a specified individual's child; (3) the adoption of a child by a specified individual; (4) the disability of a specified individual; or (5) the death of a specified individual, as specified in the policy. (In particular embodiments, the specified individual is the policy holder.) In various embodiments, the customer elects a specified payback period and an interest rate to be applied to the loan during the benefit payout and repayment period. The interest rate can be, for example, 0% or greater. In particular embodiments, the customer elects one or more terms of their coverage (e.g., the interest rate, the amount of the loan to be ultimately repaid by the customer, the benefit amount, or the payback period) via a computer system.

Figure 5:
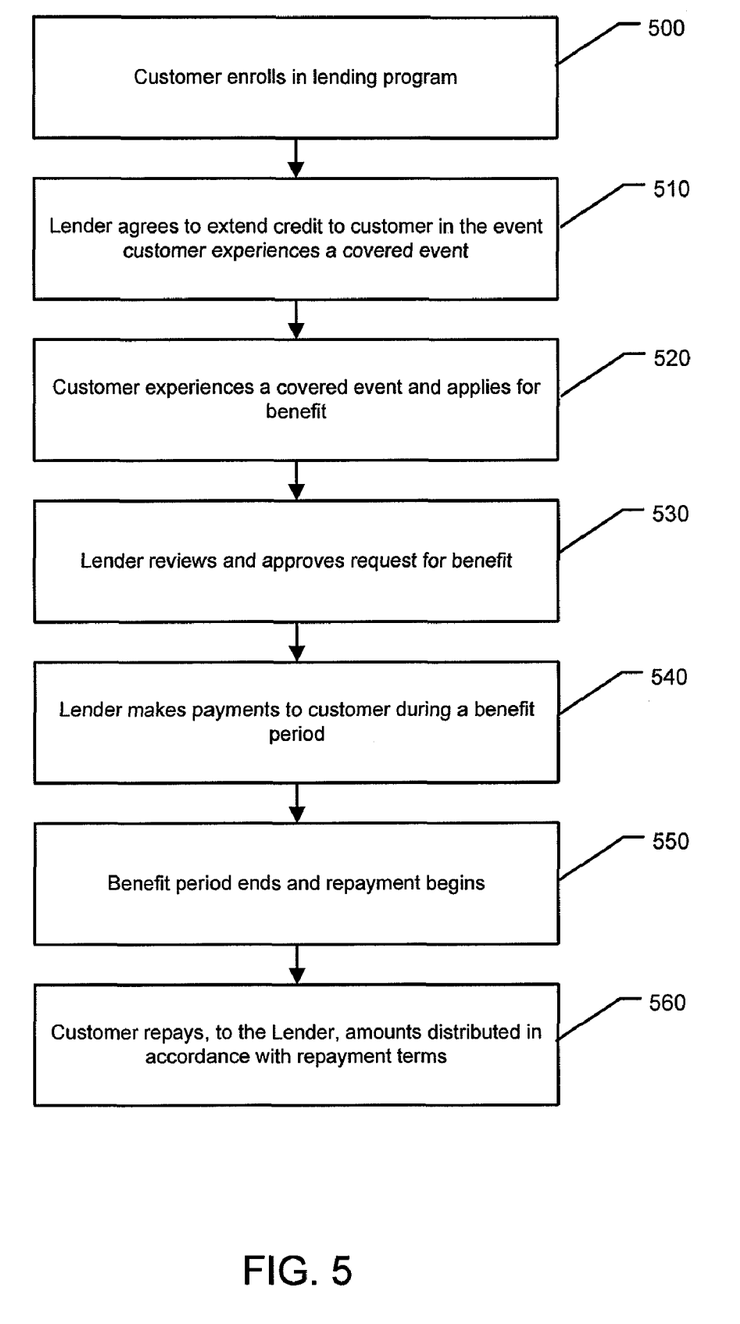
FIG. 5 is a flow chart illustrating the relationship, in another embodiment of the invention, between a customer and a lender in which the lender provides benefit payments directly to the customer, accumulates those payments, and then collects amounts previously paid out over a specified period.

Certain exemplary steps associated with this embodiment are shown in FIG. 5. In this figure, beginning at Step 500, the customer enrolls in a lending program according to a particular embodiment of the invention. At Step 510, as part of the enrollment process, the lender agrees to extend credit to the customer in the event that the customer experiences an event that is covered by the lending program. At Step 520, the customer experiences a covered event and applies to receive benefits under the lending program (e.g., by electronically transmitting a request for benefit to the lender via the Plan Implementation System 300). Next, at Step 530, the lender reviews the customer's request for benefits under the program and, if appropriate, approves the request for benefit. At Step 540, the lender then makes payments to the customer (or to other entities specified by the customer) during the benefit period as specified in the lending program. After the benefit period ends (e.g., at Step 550), the repayment period begins. During this repayment period, at Step 560, if called for under the plan, the customer repays, to the lender, amounts distributed in accordance with the plan's repayment terms.

Insurance Policy Embodiment—Funds Paid by Other Financial Institution

In particular embodiments, the customer pays premium (e.g., monthly premiums) for an insurance policy in which an insurance company promises to act as guarantor for the customer on a loan that can be drawn from one or more specified financial institutions (e.g., other than the insurance company) in the event that the customer experiences a covered event such as, for example: (1) the unemployment of a specified individual; (2) the birth of a specified individual's child; (3) the adoption of a child by a specified individual; (4) the disability of a specified individual; or (5) the death of a specified individual, as specified in the policy. (In particular embodiments, the specified individual is the policy holder.) In various embodiments, the insurance company also agrees to pay all or a portion of the interest accrued on the loan during the period in which the loan is outstanding.

Figure 6:
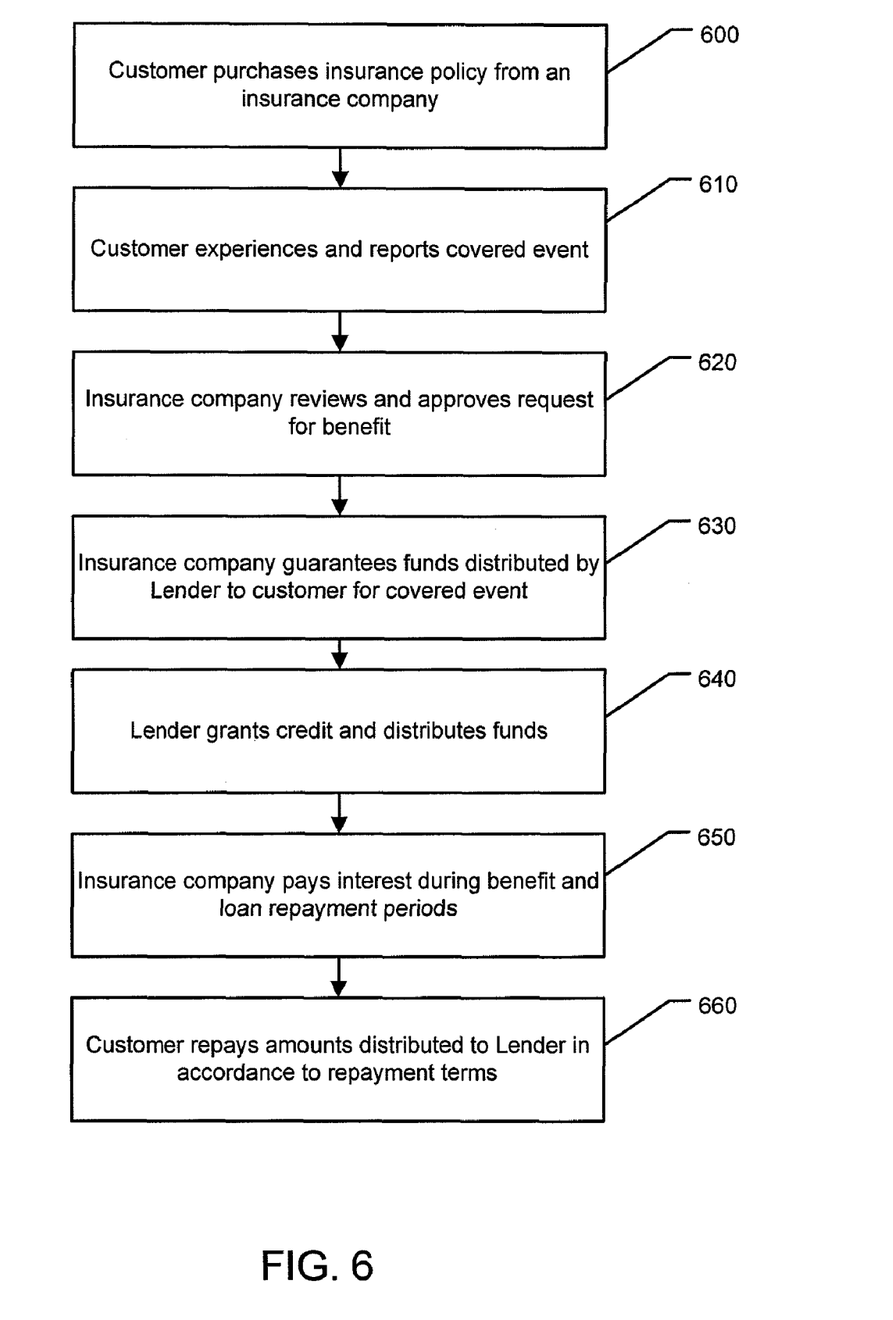
FIG. 6 is a flow chart illustrating the relationship, in a particular embodiment of the invention, between a customer, an insurance company, and a lender in which the lender provides benefit payments directly to the customer, accumulates those payments, and then collects amounts previously paid out over a specified period. The insurance company guarantees funds distributed by the lender to the customer for the covered event and pays the lender any interest that accrues on the payments during the benefit and loan repayment periods.

Various steps associated with this embodiment are shown in FIG. 6. In this figure, beginning at Step 600, the customer purchases an insurance policy. Later, at Step 610, the customer experiences and reports a covered event to the insurance company (e.g., by electronically transmitting a request for benefit via the Plan Implementation System 300). Next, at Step 620, the insurance company reviews the customer's request for benefits under the plan and, if appropriate, approves the request for benefit. At Step 630, the insurance company guarantees funds that are to be distributed by a lender to the customer for the covered event. Next, at Step 640, the lender grants the credit and distributes the funds to the customer (or to other entities specified by the customer) during the benefit period. As shown in FIG. 650, in various embodiments, during the benefit and loan repayment periods, the insurance company pays the lender all or a portion of the interest accrued on the loan. After the benefit period ends, the repayment period begins. During this repayment period, at Step 660, if called for under the policy, the customer repays amounts distributed to the Lender in accordance with the policy's repayment terms.

Bank Loan with Default Coverage Embodiment

In certain embodiments, the customer pays fees to a bank to secure a loan in which the distribution of loan proceeds are limited and conditioned upon the occurrence and/or continuation of a specified life event. An insurance policy issued to the financial institution may provide the lending institution with default coverage on the amounts loaned by the bank to the customer under the terms of the program. In particular embodiments, this insurance policy also pays the bank interest credits that serve to buy down the interest charged on the monies lent to the customer. The policy may also pay the bank interest accumulated on the loan by the customer.

Figure 7:
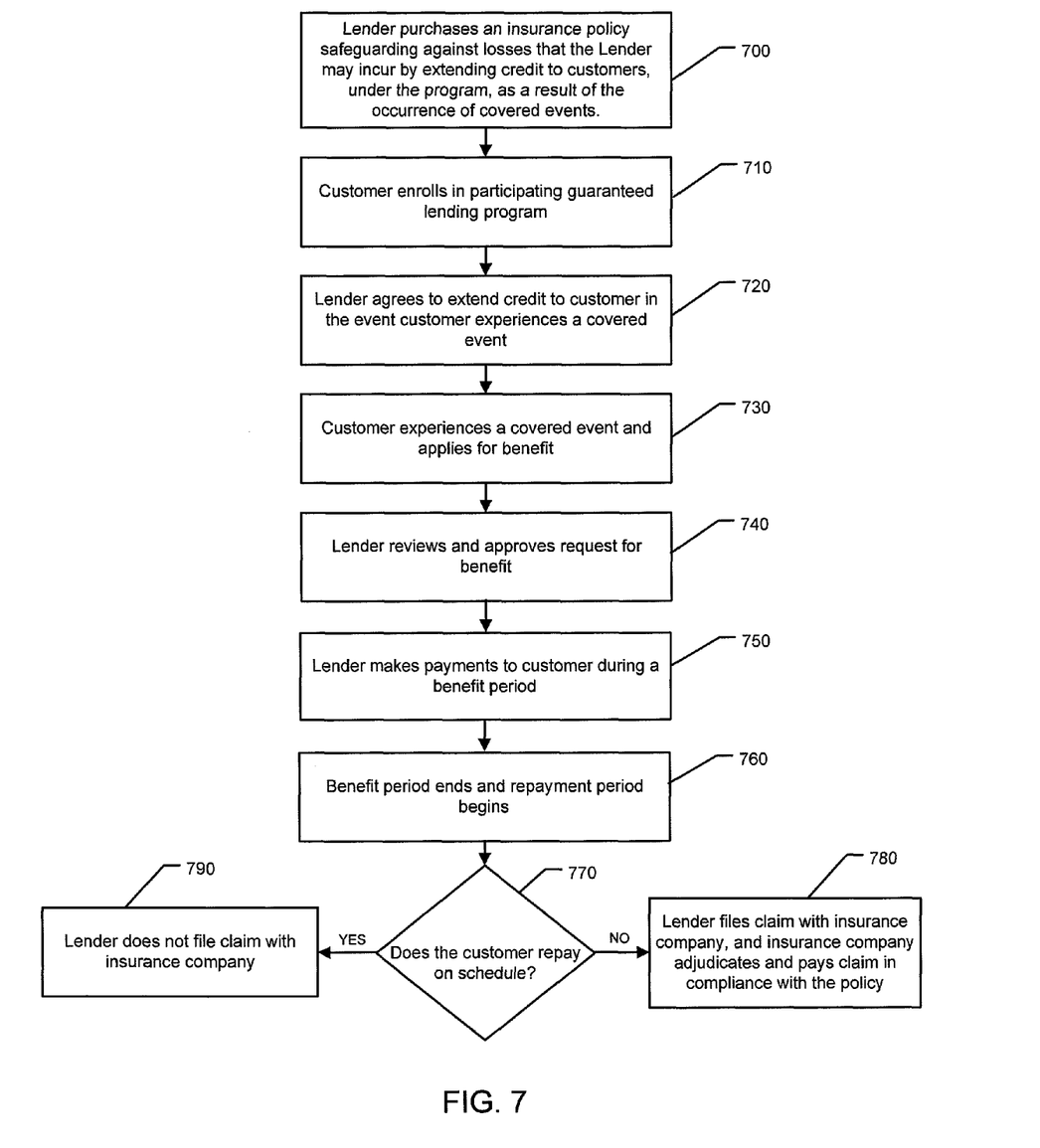
FIG. 7 is a flow chart illustrating the relationship, in a particular embodiment of the invention, between a customer, an insurance company, and a lender in which the lender provides benefit payments directly to the customer, accumulates those payments, and then collects amounts previously paid out over a specified period. The insurance company makes certain payments to the lender upon the customer's failure to repay the benefit payments on schedule.

Various steps associated with this embodiment are shown in FIG. 7. In this figure, beginning at Step 700, the lender purchases an insurance policy safeguarding against losses that the lender may incur by extending credit to customers, under the program, as a result of the occurrence of various covered events. Later, at Step 710, the customer enrolls in a participating guaranteed lending program. Next, at Step 720, the lender agrees to extend credit to the customer in the event that the customer experiences a covered event. Next, at Step 730, the customer experiences a covered event and files with the lender for benefits (e.g., by electronically transmitting a request for benefit via the Plan Implementation System 300). Next, at Step 740, the lender reviews the customer's request for benefits under the plan and, if appropriate, approves the request for benefit. Next, at Step 750, the lender grants the request and distributes the funds to the customer (or to other entities specified by the customer) during the benefit period. At Step 760, the benefit period ends and the repayment period begins.

At Step 770, a determination is made as to whether the customer has repaid the amounts to be repaid under the program on time. This step may be executed, for example, by the Plan Implementation System 300. If the customer has not repaid the funds that are due, at Step 780, the lender files a claim with the insurance company, and the insurance company adjudicates and pays the claim in compliance with the policy. If, at Step 770, a determination is made that the customer has repaid on schedule, the Lender does not file a claim with the insurance company.

It should be understood that various portions (if not all) of step 780 (and other steps described herein) may be performed, for example, via the Plan Implementation System 300. It should be further understood that particular embodiments of the invention include a combination of any one or all of the embodiments described above, or various other embodiments.

Additional Features of Various Embodiments

In particular embodiments, the computer system tracks various components of the program so as to separate the component parts into their appropriate regulatory components such as lending and insurance for various purposes including compliance with state and federal law. Also, in various embodiments, the customer is able to select (e.g., via the Plan Implementation System 300) from a series of options to build a benefit package specific to their needs in which, for example, the benefits may include a combination of cash payouts that the customer will keep and cash payouts that the customer is expected to return.

In another embodiment, the customer is able to select at the time of enrollment from various methodologies to be used to determine the amount of coverage the customer will receive in any given month. In one example, a customer may be given the option to tie their benefit levels to their monthly cash outflow from their checking account. In another example, the customer is given the option to tie the benefit levels to a percentage of monthly cash inflow from an employer through their checking account. In another example, the customer is given the option to select specific bill payments that will be used to determine the appropriate benefit amount.

In various embodiments, the customer accesses the computer system to direct the insurance company or lender how to distribute the proceeds from the amounts paid during a particular, qualified claim period. In particular embodiments, the system takes the specific direction from the customer and/or provides options to the customer to assist them in optimizing the use of the funds.

Exemplary Software Modules

In particular embodiments, the functionality described above is executed by a computer system running the various exemplary software modules described below. It should be understood that these modules are exemplary, and that other types of software modules could be used in alternative embodiments.

Customer Election Module: In particular embodiments, this module presents customers with options for: (1) assessing their needs in regard to the program (e.g., how much of a loan they will require upon the occurrence of a covered event); (2) selecting the appropriate coverage selections to meet those needs; and (3) determining which portion of the benefit distributions made under a covered event will be repaid to the insurance company or bank and which portion will not require repayment. In addition, the customer election module 200 may be adapted to: (1) allow users to specify a repayment schedule for repaying any funds that are to repaid to the bank; and (2) if applicable, allow users to specify how the interest is to be calculated on any interest-bearing portions of the funds. It should be understood that this module may include a graphical user interface, or other suitable interface, for exchanging information with the customer.

Benefit Distribution Election Module: In particular embodiments, the Benefit Distribution Election Module 225 captures the customer's election for benefit distributions. In various embodiments, this module receives detailed information from the customer regarding the customer's outstanding financial obligations. The module then uses a suitable optimization algorithm to determine an optimized approach for repaying the various financial obligations. The system then provides the customer with recommendations on how to set up their fund distributions according to this optimized approach.

Benefit Distribution Tracking Module: In certain embodiments, this module tracks all benefit distributions made to the customer and properly categorizes them according to the nature of the distribution and expectation for repayment by the customer. In particular embodiments, the Benefit Distribution Tracking Module 250 also tracks outstanding distributions to determine interest payments: (1) to be paid either by the customer or the insurance company; or (2) to be forgiven by the lender directly over the distribution period. In various embodiments, the Benefit Distribution Tracking Module 250 tracks those portions of fees and premium considered insurance or lending for regulatory purposes.

Benefit Recollection Tracking Module: In particular embodiments, the Benefit Recollection Tracking Module 275 tracks total outstanding benefit distributions expected to be repaid by the customer over the benefit collection period. In various embodiments, this module calculates the related interest amounts to be paid by the insurance company or lender to determine total benefit cost. This module may also calculate any penalty interest to be paid by the customer if the customer defaults on any or all of the repayment schedule.

EXAMPLES

As noted above, in various embodiments, the consumer pays premium for an insurance policy or other financial product that promises to provide the customer with a specified or fluctuating cash benefit stream in the event that the customer experiences a covered event specified in the policy. In particular embodiments, the benefit payments are accumulated. Upon the conclusion of the triggering event, or sometime thereafter, or at some other time, the customer is expected to begin paying all or a portion of the total amounts distributed over a specified or fluctuating repayment period. In particular embodiments, during the payout and/or repayment periods, the customer pays little or no interest on the amounts distributed. In other embodiments, the customer may pay market interest rates.

In particular embodiments, the system calculates the appropriate premiums based on the customer's specific election to: (1) either pay back all or a portion of the amounts distributed; and (2) to pay 0% or more interest on the distribution. The system tracks the accumulation of payouts and the amounts to be paid back from the customer from the time of the first payout to the customer, to the full collection of the amounts to be returned.

Example 1

As a first example, a customer may elect to purchase coverage that promises to distribute $500 (or other predetermined amount) to the customer if the customer is involuntarily unemployed, and to continue such distributions monthly for a period of up to 6 months (or other pre-determined duration of time) of continued involuntary unemployment. As part of the process of purchasing the program, the customer may choose that, in the event of such a distribution, they agree to repay 50% (or another pre-determined percentage) of the amounts distributed under the program once the customer is gainfully employed, over a specified 36 month repayment period (or other repayment period) at a 1% interest rate (or other interest rate). This interest rate may be a fixed interest rate or it may be variable (e.g., it may be a variable interest rate that is tied to the Prime Rate and that is a specified percentage lower than the Prime Rate.)

In this example, the amount to be distributed, the amount to be repaid, the repayment period and the interest rate are all variables elected by the customer at the time of enrollment and are used to determine the cost of the program to the customer (e.g., the monthly premiums to be paid by the customer for the coverage). In various embodiments, this allows the customer the option to elect the type of protection they need for the cost they can afford.

In another example, the customer elects the amount of cash they will need and the targeted amount they wish to pay and the system configures various options to achieve this objective. In another example, the customer picks other target variables and the system calculates the impact of these choices on the other components of the coverage.

In another example, an insurance company (or other provider) reviews information input by the customer and determines which program parameters are to be offered to the customer. In various embodiments, the customer can only choose the program parameters that are offered by the provider.

In one embodiment, the customer begins to repay the amounts distributed as provided for in the terms of the policy. However, in various embodiments, if the customer becomes delinquent one payment, interest is then accrued on that payment and is added to the total due from the customer. The system may also track this repayment event and uses it to determine whether the customer will be eligible for the product in the future.

Example 2

In another embodiment, the customer pays premium for an insurance policy in which the insurance company promises to act as guarantor for the customer on a loan which can be drawn from one or more financial institutions (e.g., a specified bank) in the event the customer experiences a covered event specified in the policy. In particular embodiments, the insurance company also agrees to pay all or a portion of the interest accrued on the loan during the period in which the loan is outstanding. In various embodiments, the insurance company establishes direct relationships with lenders who agree to extend credit to a customer upon the extension of a credit guarantee, by the insurance company, on amounts distributed to the consumer. The insurance company agrees to make the lender whole on any defaults arising from the extension of credit in connection with the guarantee.

In particular embodiments, the lender agrees to extend the credit at an agreed upon rate, which may be, for example, a fixed rate or the ongoing market rate at the time of distribution. In certain situations, the insurance company is able to secure a more favorable rate because of its strong credit worthiness. In various embodiments, the insurance company also agrees to pay all or portion of the interest charge directly to the lender. In this example, if the customer becomes disabled and is unable to work for two months, the insurance company extends its guarantee to the lender for the first month's distribution of the amount selected by the customer at the time of enrollment.

Upon receipt of the guarantee, the lender makes the first distribution. After the first month, the customer files for an additional distribution. Upon validation of eligibility, the insurance company extends its guarantee to the lender and the lender makes the second distribution of funds to the insurance company. In this example, in the third month, the customer is no longer disabled and therefore begins the benefit repayment period. The customer also originally elected to pay back 100% of the distributions over six months and elected a 0% interest rate.

After the first month into the repayment period, the lender bills the customer for 1/6 of the total amounts distributed (since the repayments are to occur in six equal monthly payments). The system calculates the interest payment to be made by the insurance company and the insurance company pays the lender the interest payments.

In this example, the customer defaults on the sixth payment. After the first month of nonpayment, the lender begins to charge the customer a penalty interest rate. After the second month, the lender charge offs the amount due and bills the insurance company for the remaining amount due under the policy. The insurance company then pays the lender for the charge-off.

Example 3

In one example, the customer pays fees to a lender for a loan which promises to distribute funds in the event that a customer experiences a specified life event. The bank secures an insurance policy from an insurance company which promises to pay some or all of the interest on amounts distributed to a customer. The policy also promises to pay the lender on any loan charge-offs under this lending arrangement.

In this example, the customer becomes disabled and provides the proof required by the lender regarding the disability in order to receive a distribution. The lender makes the distribution to the customer and the customer applies the proceeds to their other obligations. The customer is able to return to work after 30 days. The customer then enters the repayment period according to their elections at time of enrollment. In this example, the customer refuses to pay the amounts due. After normal collection attempts, the lender files a claim for repayment of charged off loan amounts with the insurance company. The insurance company adjudicates and pays the claim including any interest that was to have been paid by the customer on the outstanding balances.

Example 4

In another embodiment, the system is configured to allow customers to select from a series of options to build a benefit package specific to their needs in which the benefits are a combination of cash payouts that the customer will keep and cash payouts that the customer is expected to return. In one embodiment, the system is configured to allow the customer to enroll in the program via a graphical user interface on a web site. On the web site, the customer is given the option of selecting from among a series of variables to build their own program.

Via the website, the customer is asked to input how much coverage they want. They input $500 per month. The site then asks the customer to specify the portion (e.g., percentage) of the payouts they want to receive in the form of a permanent payout, and the portion of the payouts they agree to payback during a recovery period. They enter 100% payback. The site then asks the customer what interest they would like to have applied to the payback. They elect 0%. The site then asks the customer to specify a payback period. The customer enters 36 months. The system then calculates a monthly premium to be paid for a program that satisfies the customer's entered criteria, and then displays this premium to the customer for consideration on a display screen.

In another embodiment, the system asks the customer to provide a benefit amount required and a target monthly premium. The system then calculates various options of varying interest rates, payback terms, and permanent payout vs. repayment splits and presents the various options to the customer. The customer elects the option that best meets their needs and enrolls in the program.

Example 5

In another example, the customer enters a benefit period because they have adopted a child and adoption is a covered event. The customer files for benefits on a website. The claim is accepted and the customer is set to receive a $1,000 payout. The system provides the customer with the option to identify the payers to which the funds should be applied, and the amounts that each payer is to receive. The system then directly distributes funds on the customer's behalf to the payers identified by the customer.

In another example, the customer is approved for a $1,000 payout. The customer enters all potential payer information including detailed payer terms. The system then automatically provides the customer with recommendations on how to apply payments to provide an optimized use of the customer's funds. In another example, the customer is approved for a $1,000 payout. The customer grants electronic access to the system so that payment information data can be accumulated. The system then recommends the optimal use of the funds.

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

I claim:

1. A computer system comprising:
    one or more processors; and
    memory, wherein said one or more processors are configured to control said computer system to:
        (A) store policy information within said memory, said policy information indicating that a particular individual holds a policy that provides said particular individual with an option to, upon the occurrence of a qualifying event, receive a loan at a below-market rate;
        (B) receive data indicating that said qualifying event has occurred; and
        (C) at least partially in response to receiving said data indicating that said qualifying event has occurred, facilitate provision of said loan to said particular individual at said below-market rate,
        wherein said policy is an insurance policy under which: in response to an occurrence of said qualifying event, said individual is to receive said loan in the form of one or more payments to be made to the individual from an insurance company; and said individual is to ultimately repay at least a portion of said one or more payments to said insurance company.

2. The computer system of claim 1, wherein said below-market rate is 0% interest.

3. The computer system of claim 1, wherein said below-market rate is a variable rate that is lower than, and based upon, current Prime Rate.

4. The computer system of claim 1, wherein said qualifying event is an event selected from a group consisting of:
    (A) death of a specified individual;
    (B) disability of said specified individual;
    (C) involuntary unemployment of said specified individual;
    (D) birth of said specified individual's child; and
    (E) adoption of a child by said specified individual.

5. The computer system of claim 4, wherein said specified individual is said particular individual.

6. The computer system of claim 1, wherein: an amount of at least one loan disbursement to be made as part of said loan is based, at least in part, on an average outflow from an account associated with said particular individual.

7. The computer system of claim 1, wherein: an amount of at least one loan disbursement to be made as part of said loan is based, at least in part, on a rate of inflow of funds, from a specified source, into an account associated with said particular individual.

8. The computer system of claim 7, wherein: said rate of inflow of funds, from said specified source, is an average amount of funds deposited into said account from said specified source.

9. The computer system of claim 1, wherein: an amount of at least one loan disbursement to be made as part of said loan is based, at least in part, on specified bills associated with said particular individual.

10. The computer system of claim 1, wherein said one or more processors are further configured to control said computer system to:
    receive, from said individual, at least one policy preference selected from a group consisting of:
        (A) an amount of funds to be loaned to said individual under said policy;
        (B) whether, under terms of said policy, said individual will ultimately pay back (1) all funds distributed to said individual under said policy, or (2) a predetermined portion of said funds distributed to said individual under said policy;
        (C) an interest rate that said individual wishes to pay on any portions of said funds to be paid back under said policy; and
        (D) a schedule according to which said individual will pay back said funds; facilitate an implementation of said policy according to said at least one policy preference; and calculate a premium amount to be charged to said individual for said policy, said premium amount being based, at least in part, on said at least one policy preference.

11. The computer system of claim 1, wherein said one or more processors are further configured to control said computer system to track an accumulation of payouts to said individual made under said loan.

12. The computer system of claim 1, wherein said one or more processors are further configured to control said computer system to allow said individual to schedule a payment of at least a portion of said loan directly from an institution providing said loan to an entity other than said individual.

13. The computer system of claim 1, wherein said one or more processors are further configured to control said computer system to: receive information from said individual regarding a plurality of said individual's financial obligations; based on said information, determine an optimized schedule for using at least a portion of said loan to repay said financial obligations; and allow said user to schedule repayment, via said computer system, of said financial obligations according to said optimized schedule.

14. A computer program product comprising at least one non-transitory computer-readable storage medium storing computer executable instructions, the computer executable instructions comprising instructions for:
    (A) storing policy information indicating that a particular individual holds a policy that provides said particular individual with an option to, upon the occurrence of a qualifying event, receive a loan at a below-market rate;
    (B) receiving data indicating that said qualifying event has occurred; and
    (C) at least partially in response to receiving said data indicating that said qualifying event has occurred, facilitating provision of said loan to said particular individual at said below-market rate,
    wherein said policy is an insurance policy under which: in response to an occurrence of said qualifying event, said individual is to receive said loan in the form of one or more payments to be made to the individual from an insurance company; and said individual is to ultimately repay at least a portion of said one or more payments to said Insurance company.

15. The computer program product of claim 14, wherein said below-market rate is 0% interest.

16. A method comprising:
    storing policy information within a non-transitory memory, said policy information indicating that a particular individual holds a policy that provides said particular individual with an option to, upon the occurrence of a qualifying event, receive a loan at a below-market rate;
    receiving data indicating that said qualifying event has occurred; and
    at least partially in response to receiving said data indicating that said qualifying event has occurred, facilitating, by a processor, provision of said loan to said particular individual at said below-market rate,
    wherein said policy is an insurance policy under which: in response to an occurrence of said qualifying event, said individual is to receive said loan in the form of one or more payments to be made to the individual from an insurance company; and said individual is to ultimately repay at least a portion of said one or more payments to said insurance company.

17. The method of claim 16, wherein the method is performed by a computer system comprising the processor and the non-transitory memory.

18. The method of claim 17, wherein the computer system is implemented in a network-based system comprising a plurality of computers configured to communicate over the network.

19. The method of claim 16, wherein said below-market rate is 0% interest.

20. The method of claim 16, wherein said below-market rate is a variable rate that is lower than, and based upon, current Prime Rate.

21. The method of claim 16, wherein said qualifying event is an event selected from a group consisting of:
    (A) death of a specified individual;
    (B) disability of said specified individual;
    (C) involuntary unemployment of said specified individual;
    (D) birth of said specified individual's child; and
    (E) adoption of a child by said specified individual.

22. The method of claim 21, wherein said specified individual is said particular individual.

23. A computer system comprising:
    one or more processors; and
    memory, wherein said one or more processors are configured to control said computer system to:
        store policy information within said memory, said policy information indicating that a particular individual holds a policy that provides said particular individual with an option to, upon the occurrence of a qualifying event, receive a loan at a below-market rate;
        receive data indicating that said qualifying event has occurred; and
        at least partially in response to receiving said data indicating that said qualifying event has occurred, facilitate provision of said loan to said particular individual at said below-market rate,
        wherein, in response to an occurrence of said qualifying event, said individual is to receive said loan in the form of one or more payments made to said individual from a lender; said individual is to ultimately repay at least a portion of said one or payments to said lender; and under terms of said policy, an insurance company that is not said lender guarantees said loan.

24. The computer system of claim 23, wherein said lender is a bank, and wherein said bank holds insurance from said insurance company that specifically protects said bank from losses that said bank may incur as a result of making said loan to said individual under said policy.

25. The computer system of claim 24, wherein said insurance provides for payment, to the bank, of interest credits that serve to buy down an interest rate charged to said individual for said loan.

26. The computer system of claim 23, wherein under the terms of said policy, said insurance company agrees to pay said lender at least a portion of interest accrued on said loan during a period in which said loan is outstanding.

27. The computer system of claim 23, wherein said below-market rate is 0% interest.

28. The computer system of claim 23, wherein said below-market rate is a variable rate that is lower than, and based upon, current Prime Rate.

29. The computer system of claim 23, wherein said qualifying event is an event selected from a group consisting of:
    (A) death of a specified individual;
    (B) disability of said specified individual;
    (C) involuntary unemployment of said specified individual;
    (D) birth of said specified individual's child; and
    (E) adoption of a child by said specified individual.

30. The computer system of claim 29, wherein said specified individual is said particular individual.

31. A method comprising:
    storing policy information within a non-transitory memory, said policy information indicating that a particular individual holds a policy that provides said particular individual with an option to, upon the occurrence of a qualifying event, receive a loan at a below-market rate;
    receiving data indicating that said qualifying event has occurred; and
    at least partially in response to receiving said data indicating that said qualifying event has occurred, facilitating, by a processor, provision of said loan to said particular individual at said below-market rate,
    wherein, in response to an occurrence of said qualifying event, said individual is to receive said loan in the form of one or more payments made to said individual from a lender; said individual is to ultimately repay at least a portion of said one or payments to said lender; and under terms of said policy, an insurance company that is not said lender guarantees said loan.

32. The method of claim 31, wherein the method is performed by a computer system comprising the processor and the non-transitory memory.

33. The method of claim 32, wherein the computer system is implemented in a network-based system comprising a plurality of computers configured to communicate over the network.

34. The method of claim 31, wherein said lender is a bank, and wherein said bank holds insurance from said insurance company that specifically protects said bank from losses that said bank may incur as a result of making said loan to said individual under said policy.

35. The method of claim 34, wherein said insurance provides for payment, to the bank, of interest credits that serve to buy down an interest rate charged to said individual for said loan.

36. The method of claim 31, wherein under the terms of said policy, said insurance company agrees to pay said lender at least a portion of interest accrued on said loan during a period in which said loan is outstanding.

37. The method of claim 31, wherein said below-market rate is 0% interest.

38. The method of claim 31, wherein said below-market rate is a variable rate that is lower than, and based upon, current Prime Rate.

39. The method of claim 31, wherein said qualifying event is an event selected from a group consisting of:
   (A) death of a specified individual;
   (B) disability of said specified individual;
   (C) involuntary unemployment of said specified individual;
   (D) birth of said specified individual's child; and
   (E) adoption of a child by said specified individual.

40. The method of claim 39, wherein said specified individual is said particular individual.

41. A computer program product comprising at least one non-transitory computer-readable storage medium storing computer executable instructions, the computer executable instructions comprising instructions for:
   storing policy information indicating that a particular individual holds a policy that provides said particular individual with an option to, upon the occurrence of a qualifying event, receive a loan at a below-market rate;
   receiving data indicating that said qualifying event has occurred; and
   at least partially in response to receiving said data indicating that said qualifying event has occurred, facilitating provision of said loan to said particular individual at said below-market rate,
   wherein, in response to an occurrence of said qualifying event, said individual is to receive said loan in the form of one or more payments made to said individual from a lender; said individual is to ultimately repay at least a portion of said one or payments to said lender; and under terms of said policy, an insurance company that is not said lender guarantees said loan.

* * * * *